Feb. 6, 1968  R. L. RATLIFF  3,367,205

TRANSMISSION SHIFT CONTROL

Filed Dec. 20, 1965  3 Sheets-Sheet 1

INVENTOR
RICHARD L. RATLIFF
BY William J. Perry
ATTORNEY

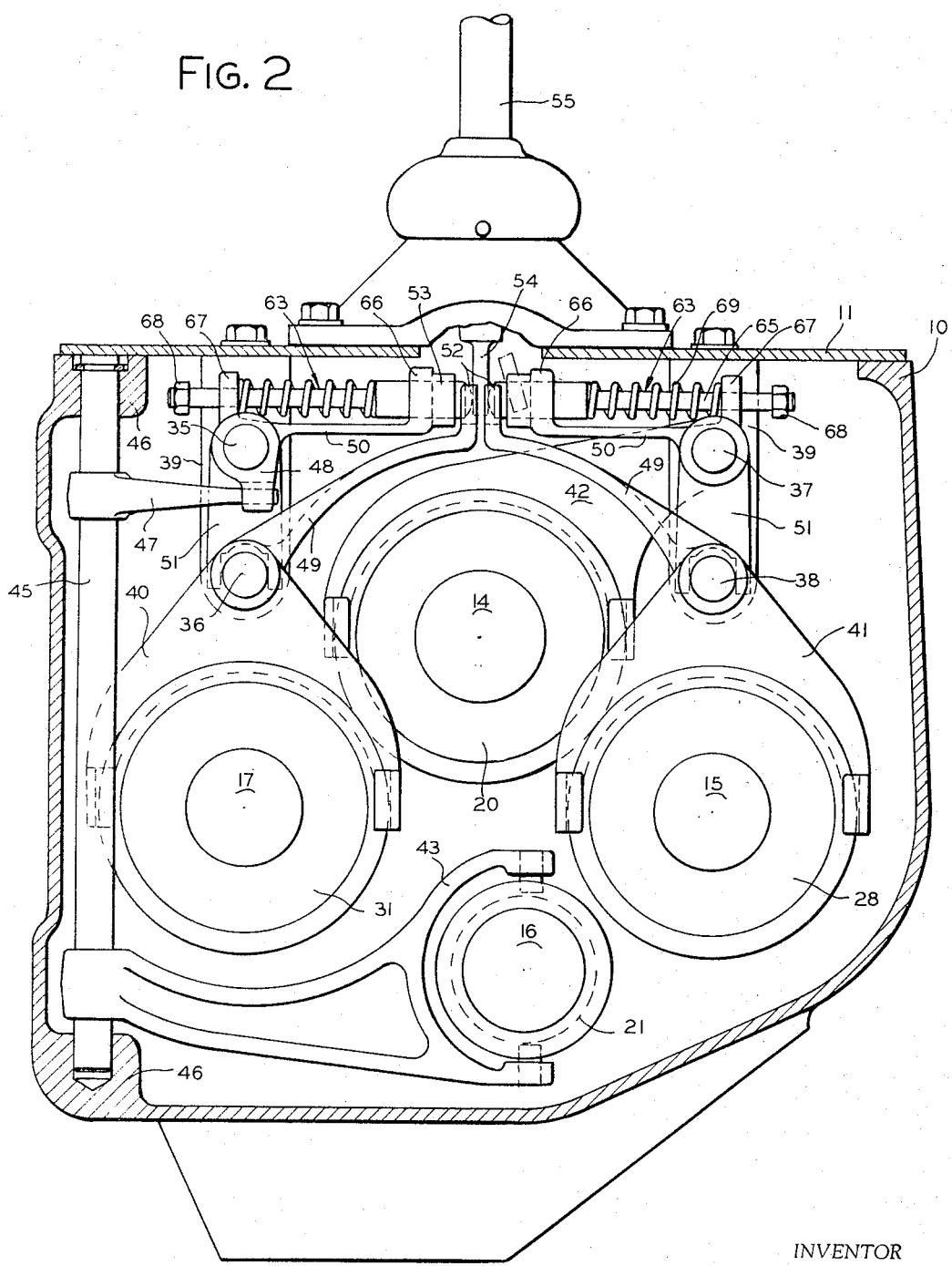

Feb. 6, 1968

R. L. RATLIFF 3,367,205

TRANSMISSION SHIFT CONTROL

Filed Dec. 20, 1965

INVENTOR
RICHARD L. RATLIFF
BY
William J. Cerny
ATTORNEY

United States Patent Office 3,367,205
Patented Feb. 6, 1968

3,367,205
TRANSMISSION SHIFT CONTROL
Richard L. Ratliff, Jackson, Mich., assignor to Clark Equipment Company, a corporation of Michigan
Filed Dec. 20, 1965, Ser. No. 515,006
3 Claims. (Cl. 74—477)

ABSTRACT OF THE DISCLOSURE

A transmission has four gears each operatively connected to a shift rail controlled through movement of an attached shift arm. The shift arms each terminate in a bifurcated end with the ends located next to each other along a line in a common plane. The shift rails are arranged in associated pairs with the bifurcated ends of the shift arms of each pair terminating adjacent each other. A selector is mounted to engage a selective one of the bifurcated ends to shift the shift arms perpendicular to the line of the bifurcated ends and thereby the associated shift rail and gear as desired.

To prevent movement of more than one shift arm of a pair at a time, a spring detent means is mounted between the rails of each of the associated pairs. The spring detent means includes a pair of detent balls biased in opposition by a spring to engage respective recesses in the shift rails. A pin of selected length is located between the detent balls to lock one rail upon movement of the other.

To prevent movement of two rails not of the same pair, a biased plunger is inserted in the two outermost shift arms and the plungers are biased inwardly within the recesses formed by the bifurcations towards the two center bifurcated ends to lock each of the center ends to the position of the adjacent outermost end. Upon movement of the selector one of the plungers is pushed against the associated bias spring and when the plunger is moved to a position that clears the engaged end the engaged bifurcated end may be moved by shifting of the selector.

---

The present invention relates to shift control mechanisms for multiple speed transmissions such as used in automotive vehicles and for other purposes.

My invention is directed particularly to a novel interlock arrangement for assuring that no more than one shift element of the mechanism may be operated at any one time, the others of the shift elements being positively locked against movement.

The provision of the invention has among its objects a transmission shift mechanism having a novel interlock to prevent shifting of any but a selected element thereof, which is simple yet positive and reliable, which is automatic in its operation, and which lends itself to a diversity of applcations.

Other and further objects, advantages, and features of the invention will appear from the following detailed description, taken in conjunction with the accompanying drawings, in which:

FIGURE 2 is a diagrammatic vertical sectional view of the structure of FIG. 1, showing the control mechanism in end elevation and largely omitting the transmission for clarity;

Figure 1:
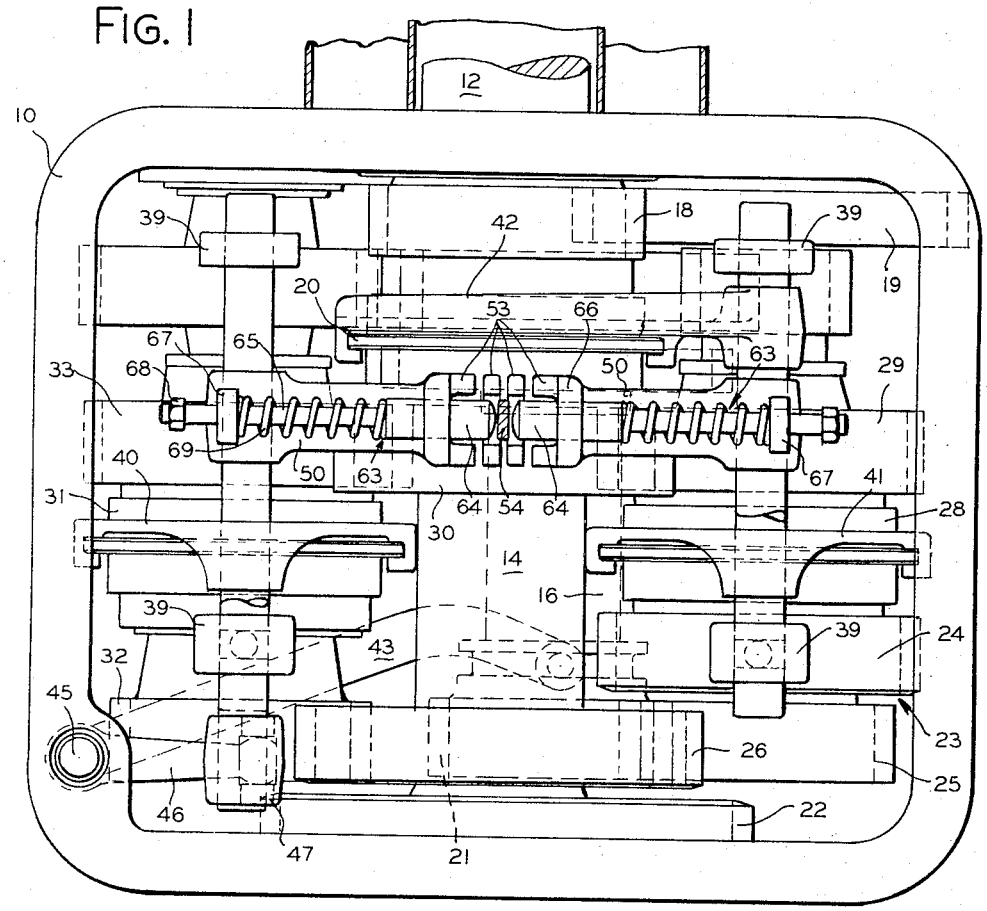
FIGURE 1 is a plan view of the shift control mechanism of the invention applied to one type of transmission.
Figure 3:
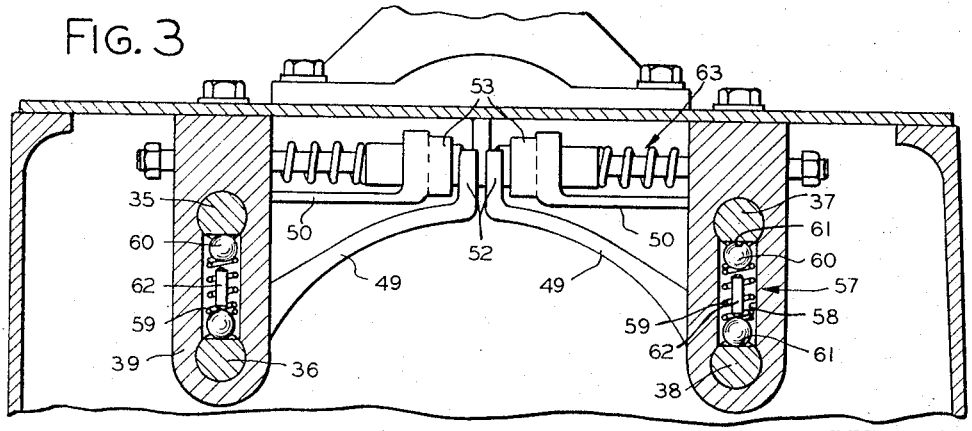
Figure 4:
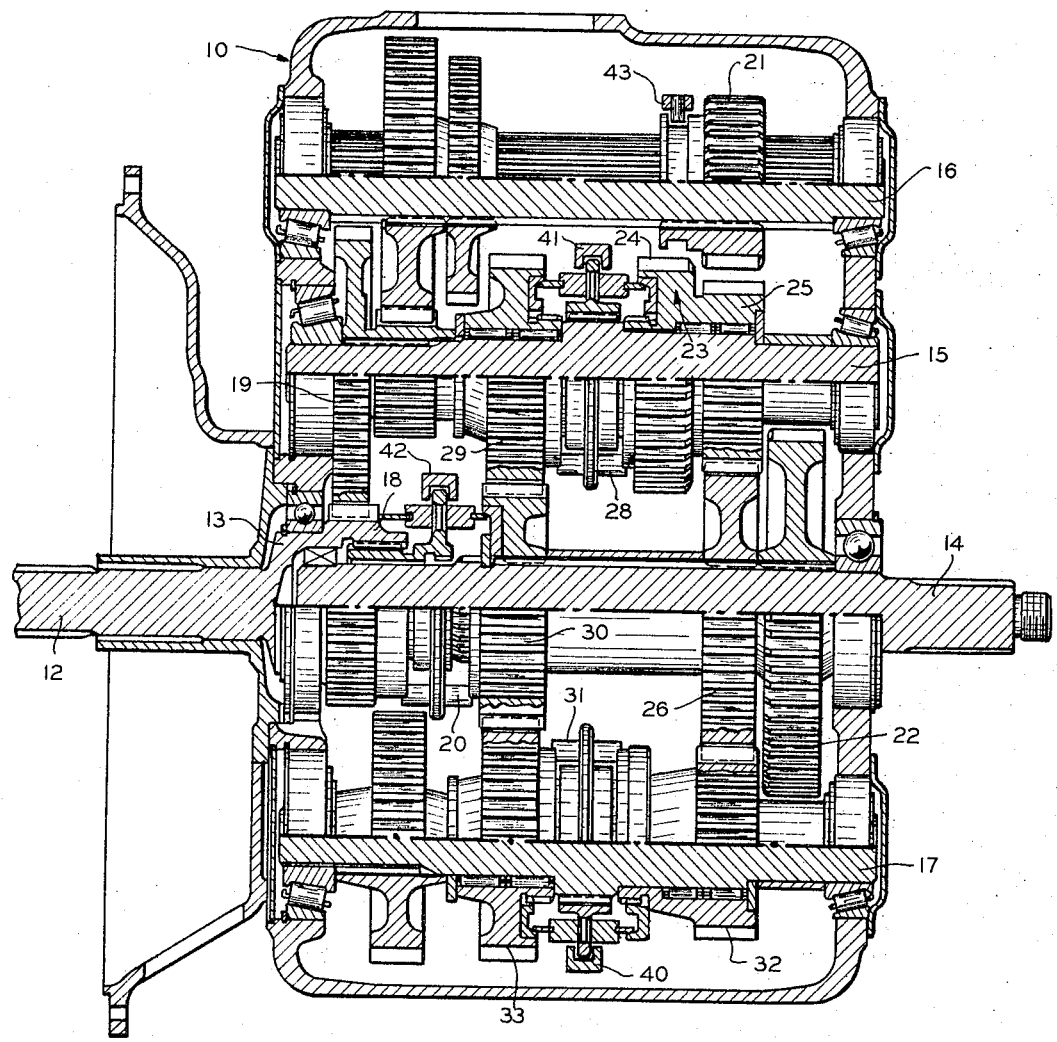

FIGURE 3 is a fragmentary vertical sectional view taken substantially as indicated by the line 3—3 in FIG. 1; and FIGURE 4 is a developed sectional view, with a portion rotated some 90° out of position, taken substantially as indicated by the line 4—4 in FIG. 2, showing the transmission in detail and indicating the interengagement therewith of the shift control mechanism.

Referring to the drawings, and first to FIGS. 1 and 4, there is shown a transmission structure comprising a housing 10 having a cover 11 (FIG. 2) for the open top thereof, and at one end rotatably mounting an input shaft 12 which at its inner end has an enlarged tubular portion or hub 13, in which is received the inner end of an output shaft 14 coaxial with input shaft 12. Three countershafts 15, 16 and 17 are rotatably mounted in any suitable manner in the housing 10, parallel to the shafts 12 and 14. An external gear 18 is formed on the hub 13 and meshes with a gear 19 fixed on countershaft 15 for driving the output shaft 14 at various speeds, forward and reverse, through other gears mounted on the shafts 15, 16 and 17, except that a connection affording direct drive of shaft 14 by shaft 12 is provided to drive the output shaft 14 at the same speed as shaft 12. To provide for the various drives, a shiftable element is mounted on each of the countershafts and on the output shaft 14 for cooperation with the various gears on the several shafts. The transmission illustrated in FIG. 4 is the subject of B. L. Frost Patent 3,318,617 entitled "Tri-Shaft Transmission," Ser. No. issued May 15, 1967 to which reference is made for a full disclosure of the construction and operation of the transmission.

For the purposes of the present invention, it is sufficient to explain that one of the shiftable elements is a clutch assembly 20 slidably mounted on the output shaft 14 and having splined connection with the hub 13 of input shaft 12. Shifting of the clutch assembly 20 to the right as viewed in FIG. 4 effects clutching of the hub 13 to the shaft 14, thus establishing a direct drive between the input shaft 12 and the shaft 14.

Another of the shiftable elements is a gear 21 splined on countershaft 16 and shiftable thereon to the right as viewed in the figure to mesh with a gear 22 fixed on shaft 14, and to the left to engage with a gear unit 23 rotatably mounted on countershaft 15, the unit 23 comprising a gear 24 and a pinion 25 of smaller diameter. The gear 24 meshes with the gear 21 when the latter is shifted to the left, while the pinion 25 is engaged with a gear 26 fixed on the output shaft 14.

A third shiftable element is a clutch assembly 28 splined on the countershaft 15 between the gear 24 of gear unit 23 and a gear 29 rotatable on shaft 15 and in mesh with a gear 30 fixed on the output shaft 14. Movement of clutch assembly 28 to the right as viewed in FIG. 4 effects clutching of the gear unit 23 to the countershaft 15, so as to drive the output shaft 14 by engagement of the pinion 25 with the gear 26. Shifting of the clutch assembly 28 to the left effects clutching of the gear 29 to the shaft 15 for driving the shaft 14 through gear 30.

A fourth shiftable element is a clutch assembly 31 splined on countershaft 17 between gears 32 and 33 rotatably mounted on countershaft 17 and respectively in mesh with the gear 26 and a gear 30 also fixed on shaft 14. Shifting of the assembly 31 to the right as seen in FIG. 4 clutches the gear 32 to shaft 17, to provide for driving output shaft 14 through the gear 26, while shifting to the left causes clutching of the gear 33 to the shaft 17 for driving the shaft 14 through gear 30.

Referring now to FIGS. 1 and 2, the shifting mechanism is illustrated as comprising four shift rods or rails 35, 36, 37 and 38, arranged in two transversely spaced pairs 35, 36 and 37, 38, the rails of each pair being vertically spaced from each other, with one pair located above the countershaft 17 and the other above the countershaft 15. The rails extend parallel to the shafts, and are mounted for longitudinal shifting or sliding movement in suitable bearings 39, in this case shown as depending from the housing cover 11. The shift rails are operatively connected to shifting elements engaging with the shiftable clutch assemblies 20, 28 and 31, and the shiftable gear 21, these shifting elements being conveniently in the form of shift yokes or forks. Shift forks 40 and 41 are fixed as by hub portions on the lower rails 36 and 38 respectively, and depend therefrom to embrace a circumferential rib portion of the clutch assembly 31 on shaft 17, and of clutch assembly 28 on shaft 15, respectively, A similar shift fork 42 is engaged with the clutch assembly 20 on the output shaft 14, and extends upwardly and laterally to the shift rail 37, on which it is secured by means of a hub portion. A fourth shift fork 43 is engaged with the gear 21 on countershaft 16 by means of pins received in a grooved hub portion of the gear. The shift fork 43 is not fixed on a shift rail, but extends laterally outwardly adjacent the lower portion of the housing 10 and has a hub portion fixed on a vertical rock shaft 45 suitably journalled in upper and lower bearing bosses 46 of the housing, and having a rocking lever or arm 47 fixed thereto adjacent the upper end thereof. The rocking lever or arm 47 extends laterally inwardly to a point adjacent the rail 35, and has a rounded end engaged in a recess of a shift lug 48 fixed as by means of a hub on the shift rail 35.

It will be evident that when any of the rails 36, 37 or 38 is moved longitudinally, the respective shift fork 40, 42 or 41 carried thereby or connected thereto is correspondingly moved to shift the shiftable member of the transmission engaged by the particular shift fork. When the shift rail 35 is moved, the rocking arm 47 is swung correspondingly by the shift lug 48, causing the rock shaft 45 to turn and thereby swing the shift fork 43 in a corresponding direction to shift the gear 21 along the countershaft 16.

To provide for shifting of the rails, each has fixed thereon a shift arm extending laterally inwardly. The free ends of the arms in a neutral position as shown are disposed adjacent each other and in the same vertical plane transverse of the rails. As shown, all of the arms may lie entirely in such plane. The shift arms 49 of the lower rails 36 and 38 extend upwardly and inwardly, while the arms 50 on the upper rails 35 and 37 are substantially horizontal. Each of the arms 50 is preferably provided with a depending portion 51 which engages slidably on the lower rail disposed therebelow. The inner end 52 of the arms 49 are disposed substantially vertically in slightly spaced relation to each other, and are forked or bifurcated, with the bifurcations aligned transversely of the rails. The inner ends of the arms 50 are bifurcated at their extremities 53, and in the neutral position are disposed slightly outwardly of the bifurcated ends 52 of the arms 49, with the bifurcations aligned with the bifurcations of the ends 52 of arms 49. A selector 54, which may be operated by any suitable means such as a shift lever 55 mounted on the cover 11 of the transmission housing 10, extends into what may be regarded as the groove or channel defined by the bifurcations of the aligned ends of the shift arms. The selector is manipulatable to engage with the bifurcated end of a selected arm and to be moved in a desired direction, so that the shift rail on which the selected shift arm is secured is moved longitudinally to effect shifting of the associated shiftable element of the transmission through the shift fork operatively connected to the particular shift rail.

Simultaneous shifting movement of both rails of a pair, as by engagement of the selector 54 with the bifurcated ends 52 and 53 of the shift arms 49 and 50 of the two rails, is prevented by spring detent means indicated generally at 57. As best shown in FIG. 3, a detent is provided in one of the bearing blocks 39 for each pair of rails 35, 36 and 37, 38. The bearing block is provided with a bore or passage 58 connecting the bores or apertures in which the two rails slide, a coil spring 59 being disposed in the passage 58 and between a pair of detent balls 60 to urge them away from each other, into engagement with the two rails. Each rail is provided with a relatively shallow recess 61 in which the adjacent ball engages. The rails are thus held against relative shifting movement by the pressure of the spring 59, which may be overcome by the force applied through the selector 54 to shift one of the rails. In such event, the ball 60 is cammed or otherwise forced out of the recess in the rail which is being shifted. A pin 62 is disposed within the spring 59 extending generally radially between the detent balls 60, and of such length that when one of the balls is displaced from its recess 61 and engaged by the outer circumferential surface of the adjacent rail, the pin is engaged with both balls to prevent movement of the other ball out of the recess 61 in the other rail. Thus when one rail of a pair is shifted, the other rail of the pair is positively locked against shifting movement. Each rail may be provided with three longitudinally spaced recesses 61, corresponding to the two shifted positions and neutral position of the rail, so that it may be held in any of its positions by the detent means.

To provide an interlock to prevent simultaneous shifting of rails of both pairs, and assure that the selector 54 will not engage more than one of the ends 52 and 53 of the shift arms, means are provided to engage in the bifurcations of the shift arms other than the shift arm selected for actuation. This means takes the form of a pair of plungers 63 slidably movable in the groove or channel defined by the neutral positioned bifurcations of the shift arms, arranged and biased in opposition to each other and engaging opposite faces of the selector 54. The plungers are advantageously mounted on the shift arms 50 of the upper shift rails 35 and 37, each having an enlarged head portion 64 of a size substantially corresponding to that of the bifurcations, and a reduced shank portion 65 extending laterally outwardly from the head portion. Each plunger is guided for movement in the plane of the neutrally positioned bifurcations by a tubular guide portion 66 formed on the respective shift arm 50 immediately outwardly of the bifurcated end portion 53, in which the plunger head portion 64 is received, and an upstanding apertured lug 67 formed at the laterally outer end of the shift arm, through which the plunger shank portion 65 projects. The laterally outer end of the shank is provided with a suitable enlargement limiting laterally inward movement of the plunger, as for example a nut 68 threaded thereon. Each plunger is urged inwardly against the selector 54 by a coil spring 69 disposed on the shank portion 65, and compressed between the lug 67 and the shoulder formed on the plunger between the head 64 and the reduced shank 65.

When the selector 54 is manipulated to engage the bifurcated end portion of one of the shift arms 49 or 50, it first moves against one or the other of the plungers 63, swinging as indicated, for example, by its dotted line position in FIG. 2, moving one of the plungers laterally outwardly against the force of its spring 69 while the other plunger follows closely against the selector, under the bias of the other spring. The plungers act like lock bolts to hold the shift arms with which they are engaged against movement parallel to the rails, and thus act in combination with the spring detent means to lock all but one of the rails against shifting regardless of which gear is being selected. The inner ends of the plunger heads may be rounded, as shown, to facilitate operation of the selector. When the selector is then moved in a plane parallel to the shift rails, only the selected shift arm is moved, and therewith the rail to which it is attached, to effect shifting of the associated shiftable element of the transmission, as already explained. By reason of the detent 57, only one shift rail of a pair may be moved at one time, and since the plungers 63 hold all but one of the shift arms against movement by the selector while also blocking engagement of the selector in more than one bifurcation, it is impossible for more than one shift arm to be moved at a time. Thus the shift rails are interlocked to prevent simultaneous movement either of the two rails of a pair, or of one rail from each pair.

The spring-biased plungers 63, in addition to the blocking and locking functions, serve to return the selector to a neutral or idle position when it is released after operation to dispose the bifurcated ends of the shift arms in the neutral position. The engagement of the plungers with the selector also provides a "feel" or opposition to its movement by which its proper positioning and manipulation may be more readily sensed.

The invention is not limited to the particular embodiment herein disclosed, which is exemplary and not exhaustive.

I claim:

1. A transmission shift construction comprising, a plurality of shifting means, four spaced shift rails arranged in pairs mounted for longitudinal sliding movement each having operative connection with at least one of said shifting means for effecting shifting movement thereof, a shift arm projecting from each of said rails and having a bifurcated end portion, the bifurcated end portions of said shifting arms in a neutral position being disposed adjacent each other with the bifurcations aligned, a selector engaging in said bifurcations and movable to move a selected shift arm and thereby the rail from which the selected arm projects to effect shifting of the connected shifting means, control means for effecting selective arm-engaging movement of said selector, a pair of opposed plungers each mounted on a different one of said shift arms and engageable in said aligned bifurcations and engaging opposite faces of the selector, means biasing each plunger for movement in opposition to the other in the aligned bifurcations to lock the arm ends against movement transversely of the plungers and prevent simultaneous shifting of the rails, and spring detent means for locking one rail of each pair against longitudinal movement upon longitudinal movement of the other rail of said pair.

2. A shift construction as defined in claim 1, in which the shift arms of the rails of each pair extend toward the arms of the other rail pair and in a neutral shift position have the bifurcations thereof lying in a common plane transverse of the rails.

3. A shift construction as defined in claim 1, in which the bifurcated end portions of the shift arms extend in angular relation to the respective arms and substantially parallel to each other, and said plungers are mounted one on each of two opposed arms.

References Cited

UNITED STATES PATENTS

| | | | |
|---|---|---|---|
| 1,365,657 | 1/1921 | Campbell | 74—477 X |
| 1,389,287 | 8/1921 | Asprooth | 74—477 |
| 2,242,027 | 5/1941 | Fishburn | 74—475 |
| 2,350,506 | 6/1944 | Haigh | 74—477 |

MILTON KAUFMAN, *Primary Examiner.*